ASYMMETRICALLY GAPPED MULTIPLE MAGNETIC HEAD
Filed March 1, 1965
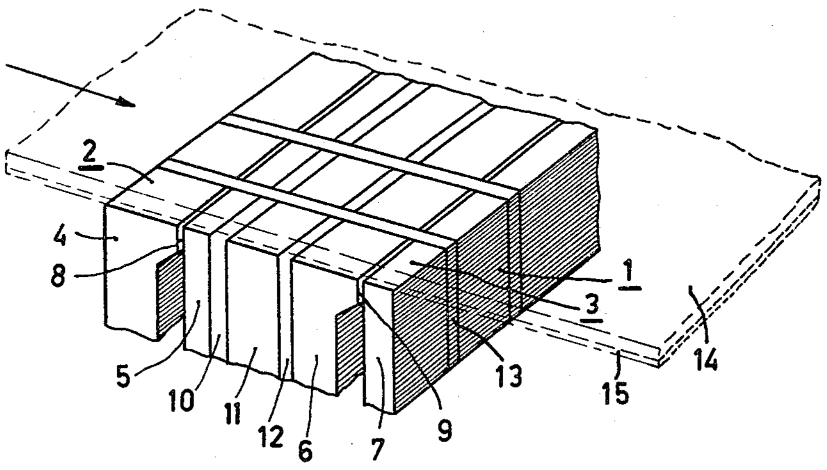
INVENTORS
JAN A. GEURST
GEORGE L. WALTHER
BY
Frank R. Trifari
AGENT United States Patent Office 3,384,882
Patented May 21, 1968

3,384,882

ASYMMETRICALLY GAPPED MULTIPLE MAGNETIC HEAD

Jan Albert Geurst and George Ludwig Walther, Emmasingel, Eindhoven, Netherlands, assignors to North American Philips Company, Inc., New York, N.Y., a corporation of Delaware Filed Mar. 1, 1965, Ser. No. 436,083
Claims priority, application Netherlands, Mar. 4, 1964, 64—2,216
2 Claims. (Cl. 340—174.1)

ABSTRACT OF THE DISCLOSURE

A multiple magnetic head having first and second gaps arranged along the same tarck traversely to the direction of movement of a record carrier has a reduced level of relative influence by arranging each of the gaps asymetrically with respect to the shield separating each of the magnetic circuits containing the gaps.

The invention relates to a multiple magnetic head for recording and reproducing one or more parallel records on a carrier provided with magnetisable material, said head consisting of at least two interconnected magnetic circuits, lying one after the other. Each head consists of at least two portions, between which a useful gap is provided and which portions are made of sintered, oxidic, ferromagnetic material and which bound the useful gap. The gap is filled out with non-magnetisable material which, affixes the two portions to each other. At least one plate of sintered, oxidic, ferromagnetic material is arranged between the magnetic circuits including the gap, and between each circuit and the plate there is disposed a plate of electrically conducting material. With such a head structure the relative influence of the two magnetic circuits is strongly reduced.

It appears to be possible, however, to further reduce the relative influence by arranging, in accordance with the invention, the gap in each magnetic circuit asymmetrically to the over-all length of the circuit viewed in the direction of movement of the carrier, while on one side of the set of plates arranged between the circuits there is located a circuit portion of greater length and on the other side a circuit portion of smaller length.

The invention will be described more fully with reference to the drawing, which shows an embodiment of the invention and represents diagrammatically, to scale, a portion of a multiple magnetic head.

In the drawing reference numeral 1 designates part of a multiple magnetic head comprising a number of recording circuits 2 and a number of reproducing circuits 3. The two circuits comprise portions 4 and 5 and portions 6 and 7 respectively, made of sintered, oxidic, ferromagnetic material. Useful gaps 8 and 9 respectively are provided between the two portions, said gaps being filled with a non-magnetisable material, which at the same time affixes the portions 4 and 5, respectively 6 and 7 to each other, for example glass. Between the recording circuits and the reproducing circuits there is arranged an assembly of plates, i.e. a plate 10 of electrically good conducting material for example silver, a plate 11 of sintered, oxidic, ferromagnetic material and a plate 12 of the same material as the plate 10. Between each pair of recording and associated reproducing circuits there are disposed screening plates 13, also of silver for example. The upper face of the portion 4 of the recording circuit is much longer in the direction of travel of the carrier 14 (shown in broken lines) having a magnetisable layer 15, indicated by the arrow, than the upper face of the portion 5. The same applies to the upper faces of the portions 6 and 7.

In order to further reduce the relative influence of the recording circuits 2 and the reproducing circuits 3 than is achieved already by means of the plates 10, 11 and 12, the circuits 2 and 3 are disposed, in accordance with the invention, relatively to the plates 10, 11 and 12 so that the narrow portions 5 and 6 are remote from each other and the narrow portion 5 engages the plate 10, whereas the portion 6 engages with the large upper surface the plate 12.

In practice it has been found that with this disposition the relative influence is, in fact, very strongly reduced and may even be substantially obviated.

As an alternative, the portion 4 of the larger upper face may engage the plate 10. In this case the portion 7 of the reproducing circuits must engage the plate 12.

What is claimed is:

1. A multiple magnetic head for recording and reproducing one or more parallel record tracks on a carrier provided with a magnetizable surface having movement relative to said head, compri ing, a first magnetic circuit having a first effective gap positioned transversely to the movement of said carrier, a second magnetic circuit having a second effective gap positioned transversely to the movement of said carrier, said first circuit having a first surface portion and a second surface portion of unequal lengths defining the boundaries of said first effective gap, said second magnetic circuit having a first surface portion and a second surface portion of unequal lengths defining the boundaries of said second effective gap, a shielding means arranged in a plane substantially paralleling each of said gaps and interconnecting said first and second magnetic circuits in a line along a single magnetic track, said shielding means adjoining a first surface of a first length of said first circuit, and a second surface of a second length of said second circuit, each gap of each circuit being thereby positioned transversely to the direction of relative movement of said carrier and asymmetrically with respect to said shielding means.

2. The combination of claim 1 wherein said shielding means is a package comprising a first plate of sintered, oxidic, ferromagnetic material and second and third plates of electrically conducting non-magnetic material on either side of said first plate, second and third plates respectively contacting said first and second magnetic circuits.

References Cited

UNITED STATES PATENTS

| | | | |
|---|---|---|---|
| 3,325,795 | 6/1967 | Mos | 340—174.1 |
| 2,922,231 | 1/1960 | Witt et al. | 340—174.1 |

BERNARD KONICK, *Primary Examiner.*

A. I. NEUSTADT, *Assistant Examiner.*

UNITED STATES PATENT OFFICE

CERTIFICATE OF CORRECTION

Patent No. 3,384,882 May 21, 1968

Jan Albert Geurst et al.

It is certified that error appears in the above identified patent and that said Letters Patent are hereby corrected as shown below:

In the heading to the printed specification, line 10, "64-2,216" should read -- 6402126 --.

Signed and sealed this 3rd day of March 1970.

(SEAL)
Attest:

Edward M. Fletcher, Jr.
Attesting Officer

WILLIAM E. SCHUYLER, JR.
Commissioner of Patents